US012739686B2

(12) United States Patent
Müller

(10) Patent No.: US 12,739,686 B2
(45) Date of Patent: Sep. 15, 2026

(54) MEASUREMENT CONFIGURATION FOR ACTIVE TRP MEASUREMENT SETS

(71) Applicant: Telefonaktiebolaget LM Ericsson (publ), Stockholm (SE)

(72) Inventor: Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 337 days.

(21) Appl. No.: 18/708,085

(22) PCT Filed: Nov. 9, 2021

(86) PCT No.: PCT/SE2021/051118
§ 371 (c)(1),
(2) Date: May 7, 2024

(87) PCT Pub. No.: WO2023/085982
PCT Pub. Date: May 19, 2023

(65) Prior Publication Data
US 2025/0031077 A1 Jan. 23, 2025

(51) Int. Cl.
*H04W 24/10* (2009.01)
*H04W 52/14* (2009.01)

(52) U.S. Cl.
CPC ........... *H04W 24/10* (2013.01); *H04W 52/14* (2013.01)

(58) Field of Classification Search
CPC ..... H04W 24/10; H04W 52/14; H04W 88/06; H04W 36/0085; H04W 48/20
See application file for complete search history.

(56) References Cited

U.S. PATENT DOCUMENTS

| | | | | |
|---|---|---|---|---|
| 2017/0332283 | A1 | 11/2017 | Kubota et al. | |
| 2020/0037385 | A1* | 1/2020 | Park | H04W 76/19 |
| 2020/0196230 | A1 | 6/2020 | Wilson et al. | |
| 2022/0086666 | A1 | 3/2022 | Ge et al. | |
| 2022/0369273 | A1* | 11/2022 | Manolakos | G01S 19/48 |

FOREIGN PATENT DOCUMENTS

WO 2020233701 A1 11/2020

OTHER PUBLICATIONS

Chiang, R., et al.; Handover Comparison between CDMA and UMTS Wireless Communication Systems—Design Concepts and Performance; 2004; consisting of 29 pages.

(Continued)

*Primary Examiner* — Shawn D Miller
(74) *Attorney, Agent, or Firm* — Weisberg I.P. Law, P.A.

(57) ABSTRACT

There is provided mechanisms for configuring a user equipment with measurement configuration of active TRP measurement sets. A method is performed by a network node. The method includes providing the measurement configuration to the user equipment relating to at least a first active TRP measurement set and a second active TRP measurement set for the user equipment to at the same time support at least two active TRP measurement sets. The method includes receiving measurement reporting from the user equipment for at least one TRP included in the first active TRP measurement set and for at least one TRP included in the second active TRP measurement set.

14 Claims, 10 Drawing Sheets

(56) References Cited

OTHER PUBLICATIONS

International Search Report and Written Opinion dated Jul. 21, 2022 for International Application No. PCT/SE2021/051118 filed Nov. 9, 2021, consisting of 17 pages.
3GPP TS 36.331 V16.5.0; 3rd Generation Partnership Project; Technical Specification Group Radio Access Network; Evolved Universal Terrestrial Radio Access (E-UTRA); Radio Resource Control (RRC); Protocol specification (Release 16); Jun. 2021, consisting of 1091 pages.
3GPP TS 38.300 V16.6.0; 3rd Generation Partnership Project; Technical Specification Group Radio Access Network; NR; NR and NG-RAN Overall Description; Stage 2 (Release 16); Jun. 2021, consisting of 152 pages.
3GPP TR 21.905 V17.0.0; 3rd Generation Partnership Project; Technical Specification Group Services and System Aspects; Vocabulary for 3GPP Specifications (Release 17); Jul. 2020, consisting of 65 pages.
3GPP TS 38.215 V16.4.0; 3rd Generation Partnership Project; Technical Specification Group Radio Access Network; NR; Physical layer measurements (Release 16); Dec. 2020, consisting of 25 pages.
3GPP TS 25.331 V16.1.0; 3rd Generation Partnership Project; Technical Specification Group Radio Access Network; Radio Resource Control (RRC); Protocol specification (Release 16); Sep. 2020, consisting of 2319 pages.

* cited by examiner

TRP 4.2

TRP 4

TRP 4.1

TRP 3.1

TRP 3

TRP 2.2

TRP 2

TRP 2.1

TRP 1.2

TRP 1

TRP 1.1

300

Time = t1

Time = t4

MEASUREMENT CONFIGURATION FOR ACTIVE TRP MEASUREMENT SETS

CROSS-REFERENCE TO RELATED APPLICATION

This application is a Submission Under 35 U.S.C. § 371 for U.S. National Stage Patent Application of International Application Number: PCT/SE2021/051118, filed Nov. 9, 2021 entitled "MEASUREMENT CONFIGURATION FOR ACTIVE TRP MEASUREMENT SETS," the entirety of which is incorporated herein by reference.

TECHNICAL FIELD

Embodiments presented herein relate to a method, a network node, a computer program, and a computer program product for configuring a user equipment with measurement configuration for the user equipment to at the same time support at least two active sets of transmission and reception points. Embodiments presented herein further relate to a method, a user equipment, a computer program, and a computer program product for the user equipment to be configured by the network node with the measurement configuration for the user equipment to at the same time support at least two active sets of transmission and reception points.

BACKGROUND

In communication networks, there may be a challenge to obtain good performance and capacity for a given communications protocol, its parameters and the physical environment in which the communication network is deployed.

Some wireless communication networks are evolving to support multi-Transmission and Reception Point (mTRP) connectivity for served user equipment. The traditional concept of a cell being associated with a single TRP is therefore becoming more of a logical concept with a cell having the possibility of being associated with multiple TRPs. A cell can constitute of time, frequency, or code, resources from one or more TRPs per user equipment connection, where the TRPs typically are spatially separated on different geographical antenna positions.

One task of mobility techniques is for the network to always use the most relevant resources in downlink (DL) and in uplink (UL) and thus be able to change resources and TRPs used for each user equipment connection as fast as possible. In order to facilitate this, the user equipment are configured by the network with measurement configuration. Further, a minimum of signaling between the network and user equipment should be used to allow the network to configure the user equipment with the most relevant resources and TRPs.

However, there could be scenarios where current mobility techniques do not enable the best TRPs to be selected.

Hence, there is a need for techniques enabling improved selection of TRPs, especially in mTRP scenarios.

SUMMARY

An object of embodiments herein is to provide techniques that address the above issues and that support network selection of TRPs to use for realizing a connection for a user equipment according to different performance metrics.

According to a first aspect there is presented a method for configuring a user equipment with measurement configuration of active TRP measurement sets. The method is performed by a network node. The method comprises providing the measurement configuration to the user equipment relating to at least a first active TRP measurement set and a second active TRP measurement set for the user equipment to at the same time support at least two active TRP measurement sets. The method comprises receiving measurement reporting from the user equipment for at least one TRP included in the first active TRP measurement set and for at least one TRP included in the second active TRP measurement set.

According to a second aspect there is presented a network node for configuring a user equipment with measurement configuration of active TRP measurement sets. The network node comprises processing circuitry. The processing circuitry is configured to cause the network node to provide the measurement configuration to the user equipment relating to at least a first active TRP measurement set and a second active TRP measurement set for the user equipment to at the same time support at least two active TRP measurement sets. The processing circuitry is configured to cause the network node to receive measurement reporting from the user equipment for at least one TRP included in the first active TRP measurement set and for at least one TRP included in the second active TRP measurement set.

According to a third aspect there is presented a network node for configuring a user equipment with measurement configuration of active TRP measurement sets. The network node comprises a provide module configured to provide the measurement configuration to the user equipment relating to at least a first active TRP measurement set and a second active TRP measurement set for the user equipment to at the same time support at least two active TRP measurement sets. The network node comprises a receive module configured to receive measurement reporting from the user equipment for at least one TRP included in the first active TRP measurement set and for at least one TRP included in the second active TRP measurement set.

According to a fourth aspect there is presented a computer program for configuring a user equipment with measurement configuration for the user equipment to at the same time support at least two active TRP measurement sets, the computer program comprising computer program code which, when run on processing circuitry of a network node, causes the network node to perform a method according to the first aspect.

According to a fifth aspect there is presented a method for is configured by a network node with measurement configuration of active TRP measurement sets. The method is performed by a user equipment. The method comprises obtaining the measurement configuration from the network node relating to at least a first active TRP measurement set and a second active TRP measurement set for the user equipment to at the same time support at least two active TRP measurement sets. The method comprises evaluating performance for the first active TRP measurement set and performance for the second active TRP measurement set. The method comprises providing measurement reporting towards the network node of the performance for at least one TRP included in the first active TRP measurement set and the performance for at least one TRP included in the second active TRP measurement set.

According to a sixth aspect there is presented a user equipment for is configured by a network node with measurement configuration for the user equipment to at the same time support at least two active TRP measurement sets. The user equipment comprises processing circuitry. The processing circuitry is configured to cause the user equipment to obtain the measurement configuration from the network node relating to at least a first active TRP measurement set and a second active TRP measurement set for the user equipment to at the same time support at least two active TRP measurement sets. The processing circuitry is configured to cause the user equipment to evaluate performance for the first active TRP measurement set and performance for the second active TRP measurement set. The processing circuitry is configured to cause the user equipment to provide measurement reporting towards the network node of the performance for at least one TRP included in the first active TRP measurement set and the performance for at least one TRP included in the second active TRP measurement set.

According to a seventh aspect there is presented a user equipment for is configured by a network node with measurement configuration for the user equipment to at the same time support at least two active TRP measurement sets. The user equipment comprises an obtain module configured to obtain the measurement configuration from the network node relating to at least a first active TRP measurement set and a second active TRP measurement set for the user equipment to at the same time support at least two active TRP measurement sets. The user equipment comprises an evaluate module configured to evaluate performance for the first active TRP measurement set and performance for the second active TRP measurement set. The user equipment comprises a provide module configured to provide measurement reporting towards the network node of the performance for at least one TRP included in the first active TRP measurement set and the performance for at least one TRP included in the second active TRP measurement set.

According to an eighth aspect there is presented a computer program for a user equipment to be configured by a network node with measurement configuration for the user equipment to at the same time support at least two active TRP measurement sets, the computer program comprising computer program code which, when run on processing circuitry of the user equipment, causes the user equipment to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects enable network selection of different active TRP resource usage sets according to different performance metrics.

Advantageously, these aspects enable the network node to select and use best possible TRPs for UL, separate from TRPs used for DL.

Advantageously, these aspects enable different performance metrics to be used for evaluating the different active TRP measurement sets.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
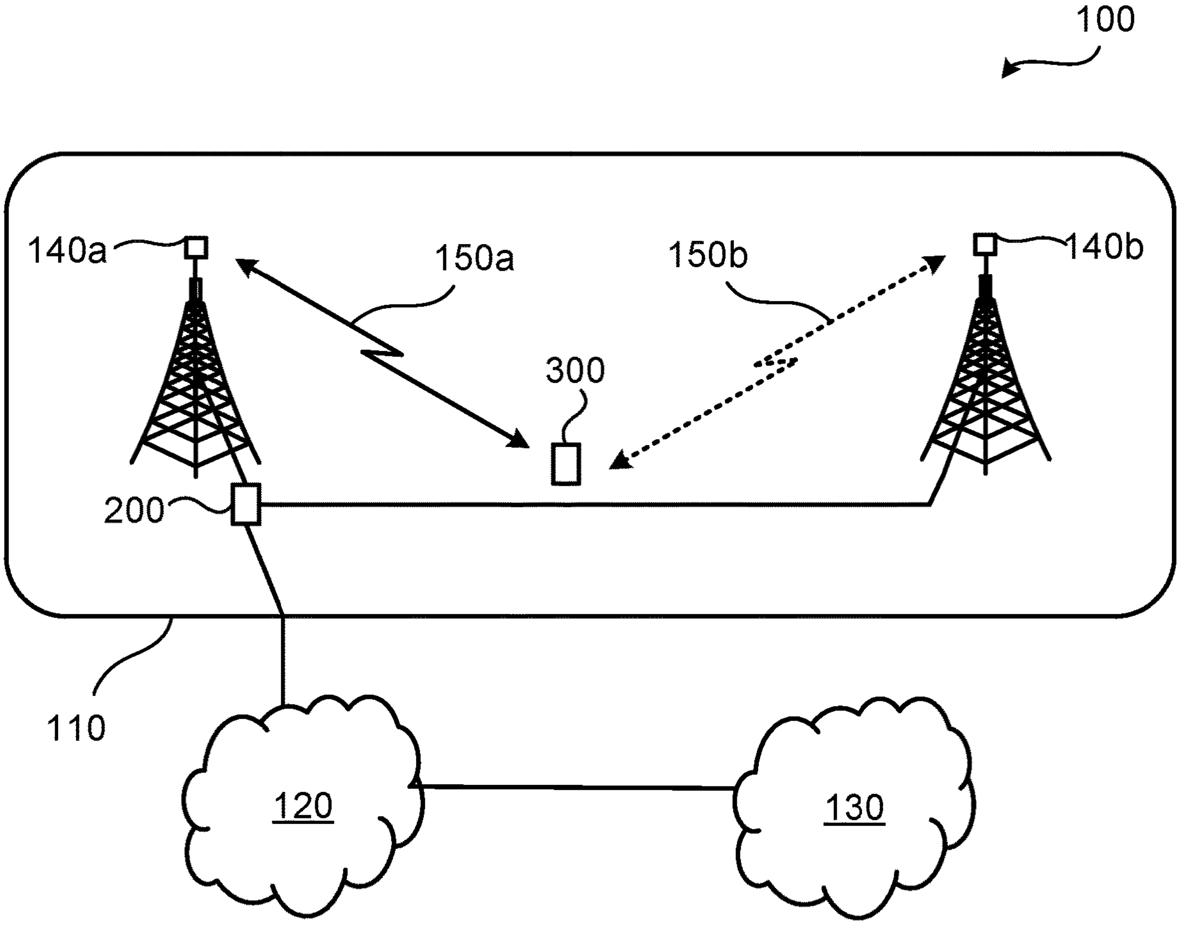
FIGS. 1, 4, 5, 6, 7 are schematic diagrams illustrating communication networks according to embodiments.

FIG. 1 is a schematic diagram illustrating an example wireless communication network 100 where embodiments presented herein can be applied. The wireless communication network 100 could be a third generation (3G) telecommunications network, a fourth generation (4G) telecommunications network, a fifth generation (5G) telecommunications network, or any evolvement thereof, and support any 3GPP telecommunications standard, where applicable. The wireless communication network 100 could alternatively be a non-cellular and/or a non-3GPP network, such as an IEEE 802.11 communications network, or any other wireless IEEE compliant communications network. The communication wireless network 100 comprises a network node 200 provided in a (radio) access network 110. The network node 200 is configured to, via TRPs 140*a*, 140*b*, provide network access to user equipment 300 over wireless links 150*a*, 150*b*. As the skilled person understands, the network node 200 might be operatively connected to a plurality of TRPs 140*a*, 140*b*. The (radio) access network 110 is operatively connected to a core network 120. The core network 120 is in turn operatively connected to a service network 130, such as the Internet. The user equipment 300 is thereby enabled to, via the network node 200 and its TRP 140*a*, 140*b*, access services of, and exchange data with, the service network 130. Examples of network nodes 200 are radio access network nodes, radio base stations, base transceiver stations, Node Bs, evolved Node Bs, gNBs, access points, and integrated access and backhaul nodes. Examples of user equipment 300 are wireless devices, mobile stations, mobile phones, handsets, wireless local loop phones, smartphones, laptop computers, tablet computers, network equipped sensors, network equipped vehicles, and so-called Internet of Things devices.

As disclosed above, there is a need for techniques enabling improved support for network selection of TRPs. In more detail, in mTRP scenarios it might be beneficial if TRPs used for DL transmission can be selected independent of TRPs used for UL transmissions. Further, UL measurements performed by the network node 200 for each user equipment 300 can be rather resource costly. Current schemes therefore result in unwanted limitations for selecting best TRPs, especially in heterogeneous networks where there is a mix of TRPs configured for high DL transmission power and TRPs configured for low DL transmission power. The TRPs that are best for UL transmission might then differ from the TRPs that are best for DL transmission since the interference situation for the user equipment is different in UL and DL, and the available user equipment power for UL transmission is typically lower than the available TRP power for DL transmissions per user equipment. This also implies that the performance metric used for selecting which TRP to be used for DL transmission might not be the best performance metric when selecting which TRP to be used for UL transmission.

The embodiments disclosed herein therefore relate to mechanisms for configuring a user equipment 300 with measurement configuration and for a user equipment 300 to be configured by a network node 200 with measurement configuration. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a user equipment 300, a method performed by the user equipment 300, and a computer program product comprising code, for example in the form of a computer program, that when run on processing circuitry of the user equipment 300, causes the user equipment 300 to perform the method.

Figure 2:
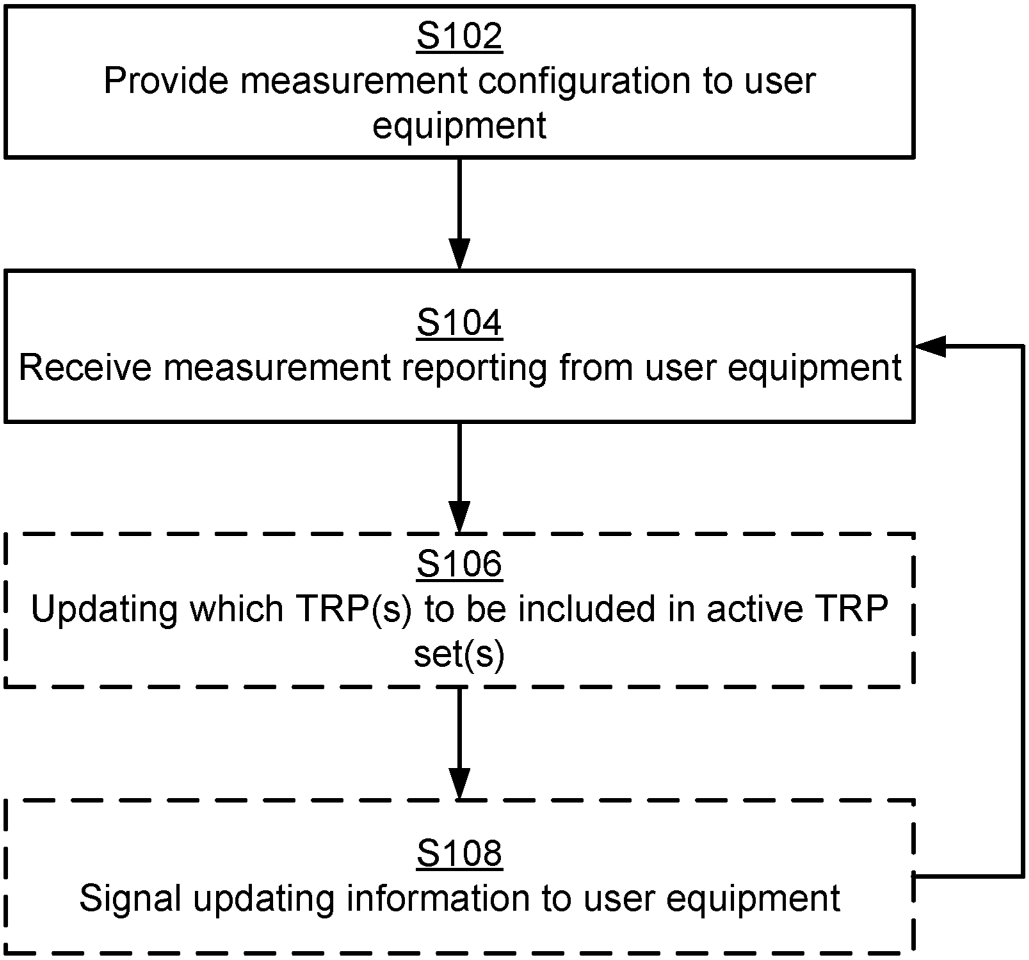
FIGS. 2 and 3 are flowcharts of methods according to embodiments.

Reference is now made to FIG. 2 illustrating a method for configuring a user equipment 300 with measurement configuration for the user equipment 300 to at the same time support at least two active TRP measurement sets 140*a*, 140*b* as performed by the network node 200 according to an embodiment.

The network node 200 provides measurement configuration to the user equipment 300 as in step S102:

S102: The network node 200 provides the measurement configuration to the user equipment 300 relating to at least a first active TRP measurement set and a second active TRP measurement set for the user equipment 300 to at the same time support at least two active measurement TRP measurement sets.

In general terms, active TRP measurement sets (or active sets of TRPs to use for measurements) are defined for the user equipment 300 to report the performance of the TRPs in the active TRP measurement sets. Thus, the user equipment 300 then evaluates performance for the first active TRP measurement set and performance for the second active TRP measurement set and then provides measurement reporting towards the network node 200 of the performance. Hence, the network node 200 is configured to perform step S104:

S104: The network node 200 receives measurement reporting from the user equipment 300 for at least one TRP 140*a*, 140*b* included in the first active TRP measurement set and for at least one TRP 140*a*, 140*b* included in the second active TRP measurement set.

The network node 200 can from the measurement reporting determine which (one or more) TRPs shall be selected and used when configuring and scheduling the user equipment 300 for actual (data) communication.

The active TRP measurement sets thus identify those TRPs that the user equipment 300 is to evaluate the performance of and provide measurement reporting of to the network node 200. The network node 200 might then, as a function of the received measurement reporting, select which TRP (or TRPs) that is (or are) to be used for actual (data) communication (in contrast to being used for pure measurement purposes) with the user equipment 300 in uplink and/or in downlink.

This method allows the user equipment 300 (as well as the network node 200 itself) to maintain at least two configured active TRP measurement sets for the user equipment 300 to measure, evaluate, and report to the network node 200. As will be disclosed in more detail below, this can be used to support the network node 200 to update the members in each active TRP measurement set.

Hence, a distinction is herein made between active TRP sets used for measurements and active TRP sets used for actual communication. The former is herein referred to as active TRP measurement sets. This distinction is made since there is a difference between the user equipment 300 on the one hand providing measurement reporting according to configuration by the network node 200, and the network node 200 on the other hand selecting (and configuring the user equipment 300 with) the actual TRP resources to be use by the user equipment 300 for actual communication.

Embodiments relating to further details of configuring a user equipment 300 with measurement configuration for the user equipment 300 to at the same time support at least two active TRP measurement sets 140*a*, 140*b* as performed by the network node 200 will now be disclosed.

Further aspects of the measurement configuration will be disclosed next.

In some aspects, evaluation of the active TRP measurement sets is based on different measured quantities metrics. Hence, according to the measurement configuration, the user equipment 300 might further be configured by the network node 200 to evaluate performance of the first active TRP measurement set and of the second active TRP measurement set according to mutually different measurement quantities.

In other aspects, the evaluation of the active TRP measurement sets is based on the same measured quantities, or metrics, but using a compensation with different offset factors. Hence, according to the measurement configuration, the user equipment 300 might further be configured by the network node 200 to evaluate performance of the first active TRP measurement set and of the second active TRP measurement set according to identical measurement quantities but with an offset between uplink performance and downlink performance.

There might be different ways in which the performance of the active TRP measurement sets is measured. In some aspects the performance pertains to resource usage. That is, in some embodiments, the performance pertains to usage of time/frequency resources for communicating with the network node 200 via at least one of the TRPs 140*a*, 140*b*.

In some aspects, the first active TRP measurement set is for DL and the second active TRP measurement set is for UL. That is, in some embodiments, the first active TRP measurement set is for the user equipment 300 to evaluate downlink performance and the second active TRP measurement set is for the user equipment 300 to evaluate uplink performance. Hence, one active TRP measurement set can be defined for DL and another active TRP measurement set can be defined for UL. When these TRP measurement sets have been defined, the performance of each of these TRP measurement set will be reported by the user equipment 300 when actions, as taken by the network node 200, are needed, for examples for the network node 200 to determine which of these TRPs to be scheduled in DL and UL, respectively, for communication with the user equipment 300. DL scheduling decisions can be based on the reporting of the quality of the DL reference signals of the active TRP measurement set defined for DL. UL scheduling decisions can be based on the reportings of the quality of the DL reference signals of the active TRP measurement set defined for UL.

Aspects of how the user equipment 300 might be configured by the network node 200 to evaluate the performance of the active TRP measurement sets will be disclosed next.

In some aspects, the UL performance is to be evaluated using a path metric, such as path gain or pathloss. That is, in some embodiments, according to the measurement configuration, the user equipment 300 further is configured by the network node 200 to evaluate the uplink performance according to a path metric, such as path gain or pathloss. In this respect, the path gain and the pathloss can be expressed as follows:

Path gain=*UE* received *DL* reference signal power−*NW* transmitted *DL* reference signal power [dB]

Pathloss=*NW* transmitted *DL* reference signal power−*UE* received *DL* reference signal power [dB]

In this respect, the parameter "UE received DL reference signal power" is the reference signal power as received by the user equipment 300 from the network node 200 via one of the TRPs. The parameter "NW transmitted DL reference signal power" is the reference signal power as transmitted by the network node 200 via one of the TRPs. Information about the NW transmitted DL reference signal power per TRP might be provided to the user equipment 300 from the network node 200.

In some aspects, the DL performance is to be evaluated using a received signal metric, such as reference signal received power or received signal quality. That is, in some embodiments, according to the measurement configuration, the user equipment 300 further is configured by the network node 200 to evaluate the downlink performance according to a power metric, such as reference signal received power.

Hence, in some examples, one active TRP measurement set can be used and evaluated for best UL performance, based on a path metric, whereas another active TRP measurement set is used and evaluated for best DL performance e.g., based on received DL reference signal power.

There could be different criteria for when the user equipment 300 is to provide the measurement reporting to the network node 200. In particular, in some embodiments, the user equipment 300 further is configured by the network node 200 to only provide the measurement reporting when the first active TRP measurement set fulfils a first measurement report triggering condition and/or the second active TRP measurement set fulfils a second configured measurement report triggering condition. The first measurement report triggering condition and the second measurement report triggering condition are selected from a set of events. Non-limiting examples of such events are:

Event 1: A detected TRP enters Reporting Range,

Event 2: An active TRP leaves Reporting Range,

Event 3: A detected TRP leaves Reporting Range,

Event 4: A detected TRP becomes better than an active TRP,

Event 5: Change of best active TRP,

Event 7: An active TRP becomes worse than an absolute threshold,

Event 8: An active TRP becomes better than an absolute threshold,

Event 9: Change of best TRP (active or detected),

Event 10: A TRP becomes worse than an absolute threshold, and

Event 11: A TRP becomes better than an absolute threshold.

These are all just some examples of events.

In some examples, according to the measurement configuration, the event of the first measurement report triggering condition is different from the event of the second measurement report triggering condition.

In some aspects, the user equipment 300 is configured to maintain active TRP measurement sets that are based on different metrics, different frequency bands, or different event criteria, where one active TRP measurement set is actually used by the user equipment 300 for communication with the network node 200 whereas other active TRP measurement sets are candidates to be used by the user equipment 300 for communication with the network node 200 (and hence used for measurement purposes only). In particular, in some embodiments, according to the measurement configuration, the user equipment 300 is allowed to maintain at least two different TRP measurement sets for evaluating downlink performance. The downlink performance for the at least two different TRP sets is to be evaluated according to any of: mutually different measurement quantities, mutually different frequency bands, mutually different downlink triggering conditions.

The measurement configuration provided by the network node 200 to the user equipment 300 in step S104 is maintained by the ser equipment 300. In some aspects, the network node 200 might provide updates to the measurement configuration. Hence, in some embodiments, the network node 200 is configured to perform (optional) steps S106 and S108:

S106: The network node 200 updates which at least one TRP 140*a*, 140*b* to be included in the first active TRP measurement set and which at least one TRP 140*a*, 140*b* to be included in the second active TRP measurement set.

S108: The network node 200 signals updating information to the user equipment 300 identifying which at least one TRP 140*a*, 140*b* to be included in the first active TRP measurement set and which at least one TRP 140*a*, 140*b* to be included in the second active TRP measurement set.

The user equipment 300 might then evaluate the performance of the first active TRP measurement set and the second active TRP measurement set as updated and the network node 200 might again receive measurement reportings by again entering step S104, as illustrated in FIG. 2.

In this respect, the network node 200 might update the first active TRP measurement set and/or the second active TRP measurement set. When both the first active TRP measurement set and the second active TRP measurement set are to be updated, the network node 200 might either provide the update for both the first active TRP measurement set and the second active TRP measurement set in one and the same message, or provide the respective updates in separate messages; one message for the first active TRP measurement set and another message for the second active TRP measurement set.

The network node 200 might select to use resources from all or a subset of the TRPs based on the received active TRP measurement set information and configure the user equipment 300 with the selection of TRPs to be used. In downlink it might be so that the user equipment 300 should, according to network configuration, be prepared and implicit use the reported active TRP measurements set also for active TRP resource usage. In UL it might be so that the user equipment 300 should, according to network configuration, be prepared and implicit use one or several of the reported active TRP measurements set also for active TRP resource usage set.

The network node 200 might add, release, or replace TRPs 140*a*, 140*b* for serving the user equipment 300 based on the measurement reporting in step S104. That is, in some embodiments, the updating at least partly is based on the measurement reporting received from the user equipment 300. Further, the updating of the active TRP measurement sets might be based on different measured quantities and event criteria for the different active TRP measurement sets.

Figure 3:
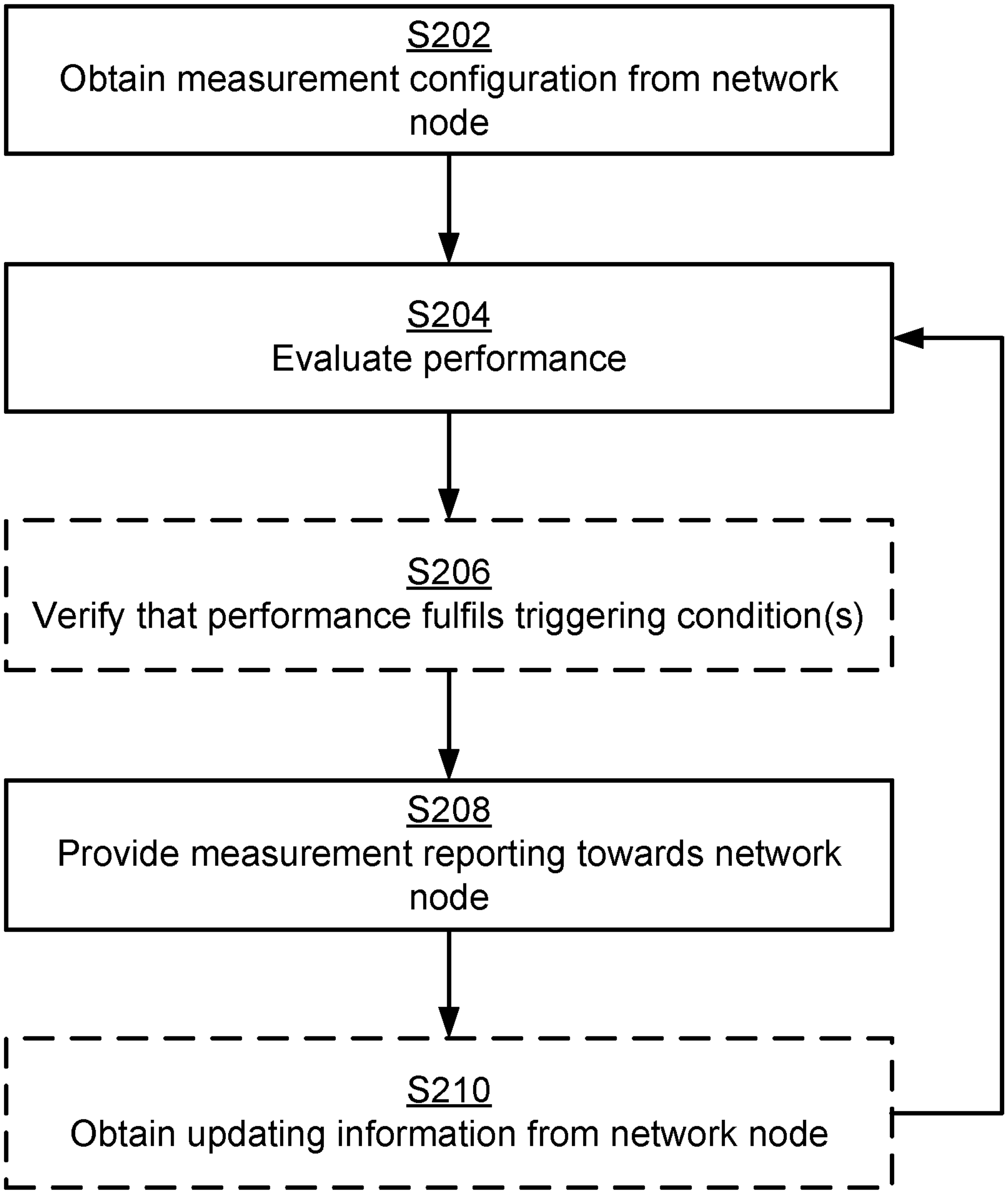

Reference is now made to FIG. 3 illustrating a method for a user equipment 300 to be configured by a network node 200 with measurement configuration for the user equipment 300 to at the same time support at least two active measurement TRP measurement sets 140*a*, 140*b* as performed by the user equipment 300 according to an embodiment.

The network node 200 provides measurement configuration to the user equipment 300 as in step S102. It is assumed that the user equipment 300 receives this measurement configuration. Hence, the user equipment 300 is configured to perform step S202:

S202: The user equipment 300 obtains the measurement configuration from the network node 200 relating to at least a first active TRP measurement set and a second active TRP measurement set for the user equipment 300 to at the same time support at least two active measurement TRP measurement sets 140*a*, 140*b*.

The user equipment 300 then evaluates performance for the first active TRP measurement set and performance for the second active TRP measurement set and then provides measurement reporting towards the network node 200 of the performance. That is, the user equipment 300 is configured to perform steps S204 and S208:

S204: The user equipment 300 evaluates performance for the first active TRP measurement set and performance for the second active TRP measurement set.

S208: The user equipment 300 provides measurement reporting towards the network node 200 of the performance for at least one TRP 140*a*, 140*b* included in the first active TRP measurement set and the performance for at least one TRP 140*a*, 140*b* included in the second active TRP measurement set.

As disclosed above, the active TRP measurement sets identify those TRPs that the user equipment 300 is to evaluate the performance of and provide measurement reporting of to the network node 200.

Embodiments relating to further details of a user equipment 300 to be configured by a network node 200 with measurement configuration for the user equipment 300 to at the same time support at least two active measurement TRP measurement sets 140*a*, 140*b* as performed by the user equipment 300 will now be disclosed.

Further aspects of the measurement configuration will be disclosed next.

As disclosed above, in some aspects, the evaluation of the active TRP measurement sets is based on different measured quantities metrics. Hence, according to the measurement configuration, the user equipment 300 might further be configured by the network node 200 to evaluate the performance of the first active TRP measurement set and of the second active TRP measurement set according to mutually different measurement quantities.

As further disclosed above, in other aspects, the evaluation of the active TRP measurement sets is based on the same measured quantities, or metrics, but using a compensation with different offset factors. Hence, according to the measurement configuration, the user equipment 300 might further be configured by the network node 200 to evaluate the performance of the first active TRP measurement set and of the second active TRP measurement set according to identical measurement quantities but with an offset between uplink performance and downlink performance.

As disclosed above, there might be different ways in which the performance of the active TRP measurement sets is measured. As further disclosed above, in some aspects the performance pertains to resource usage. That is, in some embodiments, the performance pertains to usage of time/frequency resources for communicating with the network node 200 via at least one of the TRPs 140*a*, 140*b*.

As disclosed above, in some aspects, the first active TRP measurement set is for DL and the second active TRP measurement set is for UL. That is, in some embodiments, the first active TRP measurement set is for evaluating downlink performance and the second active TRP measurement set is for evaluating uplink performance.

Aspects of how the user equipment 300 might be configured by the network node 200 to evaluate the performance of the active TRP measurement sets will be disclosed next.

As disclosed above, in some aspects, the UL performance is to be evaluated using a path metric, such as path gain or pathloss. That is, in some embodiments, according to the measurement configuration, the user equipment 300 further is configured by the network node 200 to evaluate the uplink performance according to a path metric, such as path gain or pathloss.

As disclosed above, in some aspects, the DL performance is to be evaluated using a received signal metric, such as reference signal received power or received signal quality. That is, in some embodiments, according to the measurement configuration, the user equipment 300 further is configured by the network node 200 to evaluate the downlink performance according to a power metric, such as reference signal received power.

In some aspects, the user equipment 300 in step S208 only provides the measurement reporting towards the network node 200 when some measurement report triggering condition is fulfilled. That is, in some embodiments, the user equipment 300 is configured to perform (optional) step S206:

S206: The user equipment 300 verifies that the first active TRP measurement set fulfils a first measurement report triggering condition and/or the second active TRP measurement set fulfils a second measurement report triggering condition before providing the measurement reporting.

The first measurement report triggering condition and the second measurement report triggering condition are selected from a set of events. As disclosed above, there could be different criteria for when the user equipment 300 is to provide the measurement reporting to the network node 200. Hence, according to the measurement configuration, the event of the first measurement report triggering condition might be different from the event of the second measurement report triggering condition.

As disclosed above, in some aspects, the user equipment 300 is configured to maintain active TRP measurement sets that are based on different metrics, different frequency bands, or different event criteria. In particular, in some embodiments, according to the measurement configuration, the user equipment 300 is allowed to maintain at least two different TRP measurement sets for evaluating downlink performance. The downlink performance for the at least two different TRP measurement sets is to be evaluated according to any of: mutually different measurement quantities, mutually different frequency bands, mutually different downlink triggering conditions.

As disclosed above, in some aspects, the network node 200 might provide updates to the measurement configuration. Hence, in some embodiments, the user equipment 300 is configured to perform (optional) step S210:

S210: The user equipment 300 obtains updating information from the network node 200 identifying which at least one TRP 140*a*, 140*b* to be included in the first active TRP measurement set and which at least one TRP 140*a*, 140*b* to be included in the second active TRP measurement set.

The user equipment 300 might then evaluate the performance of the first active TRP measurement set and the second active TRP measurement set as updated by again entering step S204, as illustrated in FIG. 3

Figure 4:
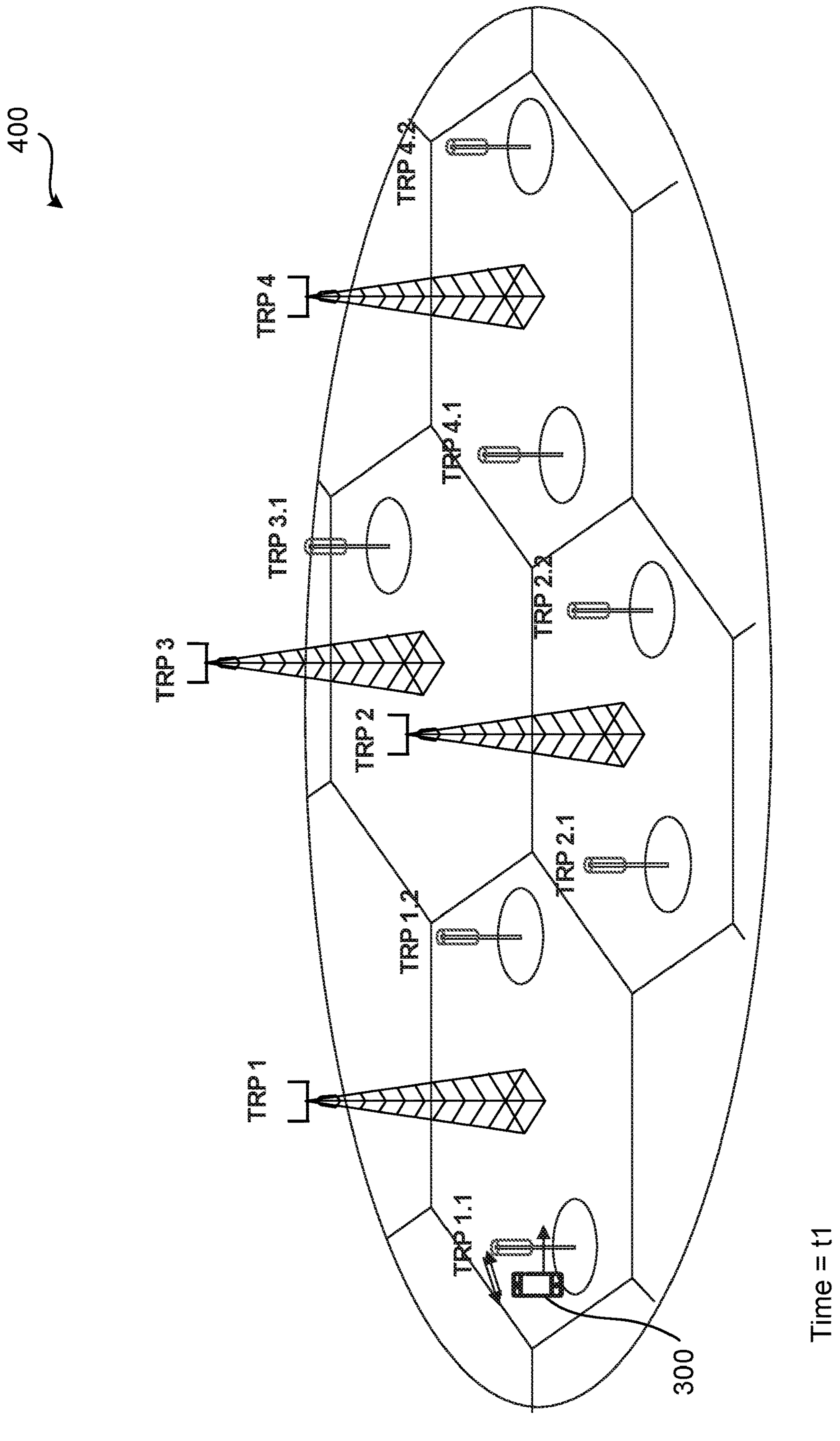
Figure 5:
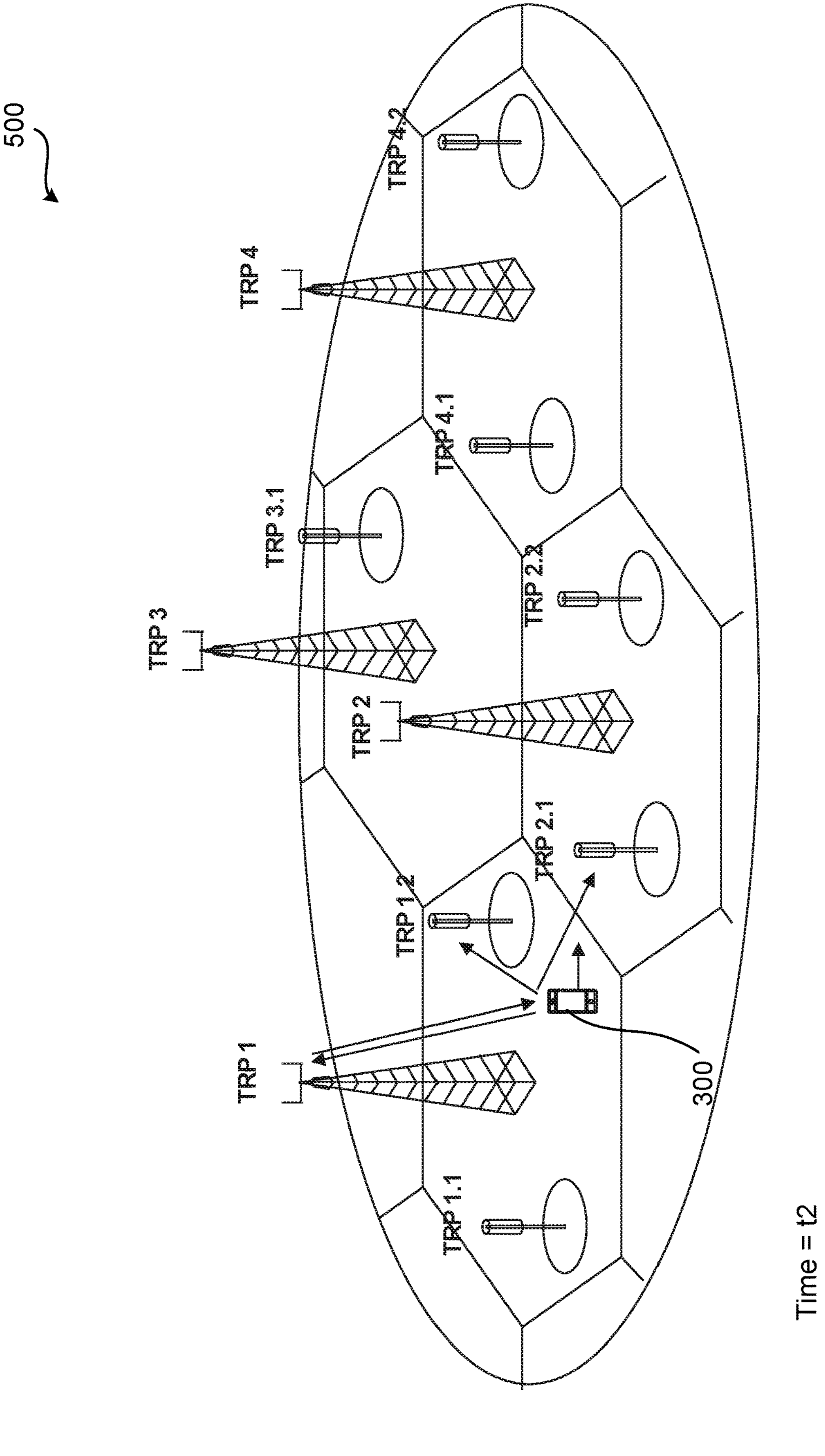
Figure 6:
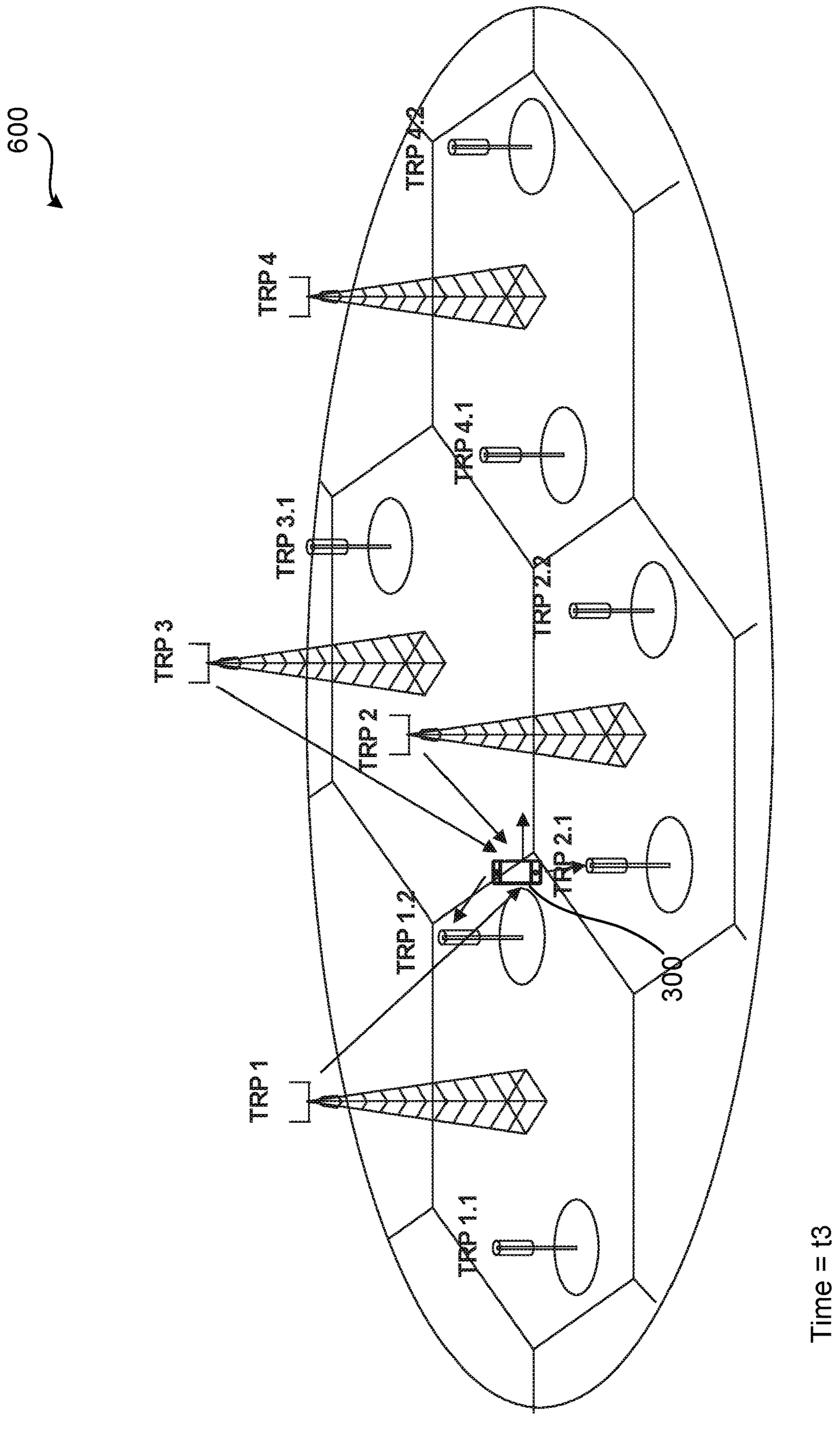
Figure 7:
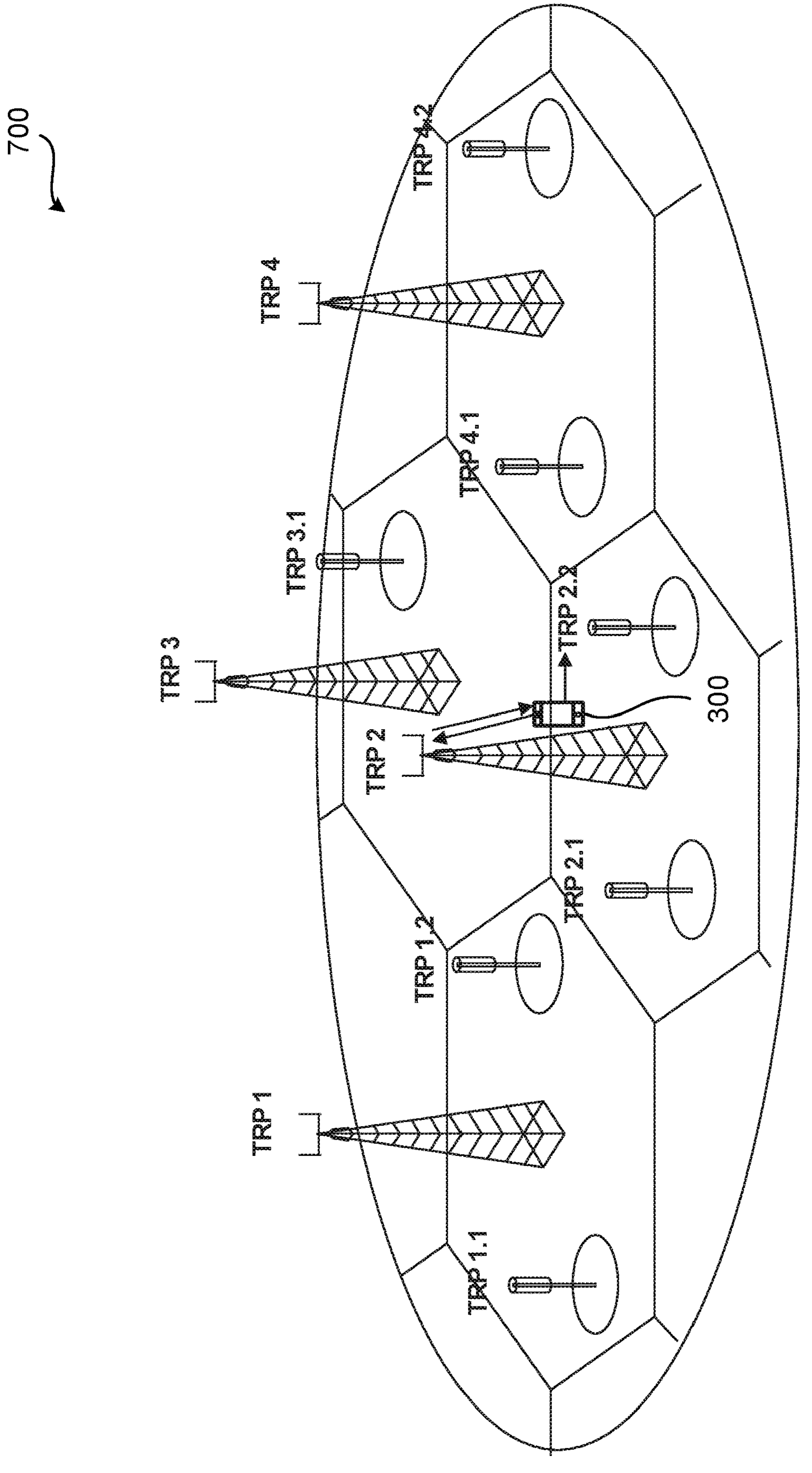

Reference will next be made to FIGS. 4, 5, 6, and 7 for illustrating a first example of how active TRP measurement sets as maintained for a user equipment 300 can change over time. FIGS. 4, 5, 6, and 7 all illustrate a communication network 400, 500, 600, 700 for one and the same network topology but where the user equipment 300 from figure to figure traverses the communication network by moving from one location to the next. Therefore, also the active TRP measurement sets for the user equipment 300 change from figure to figure. In this illustrative example, the user equipment 300 maintains a first active TRP measurement set for DL and a second active TRP measurement set for UL. Directional arrows from one or more TRP towards the user equipment 300 show DL connections. Directional arrows from the user equipment 300 towards one or more TRP show UL connections. According to the network topology, the communication network 400, 500, 600, 700 comprises four (high-power) macro TRPs denoted TRP 1, TRP 2, TRP 3, and TRP 4, as well as seven (low-power) micro TRPs denoted TRP 1.1, TRP 1.2, TRP 2.1, TRP 2.2, TRP 3.1, TRP 4.1, and TRP 4.2. The communication network 400, 500, 600, 700 is sectorized according to the macro TRPs and hence the used notation for the micro TRPs. FIG. 4 illustrates the situation at time t1. The first active TRP measurement set consists of TRP 1.1. The second active TRP measurement set consists of TRP 1.1. FIG. 5 illustrates the situation at time t2>t1. The first active TRP measurement set consists of TRP 1. The second active TRP measurement set consists of TRP 1, TRP 1.2, and TRP 2.1. FIG. 6 illustrates the situation at time t3>t2. The first active TRP measurement set consists of TRP 1, TRP 2, and TRP 3. The second active TRP measurement set consists of TRP 1.2, and TRP 2.1. FIG. 7 illustrates the situation at time t4>t3. The first active TRP measurement set consists of TRP 2. The second active TRP measurement set consists of TRP 2.

Figure 8:
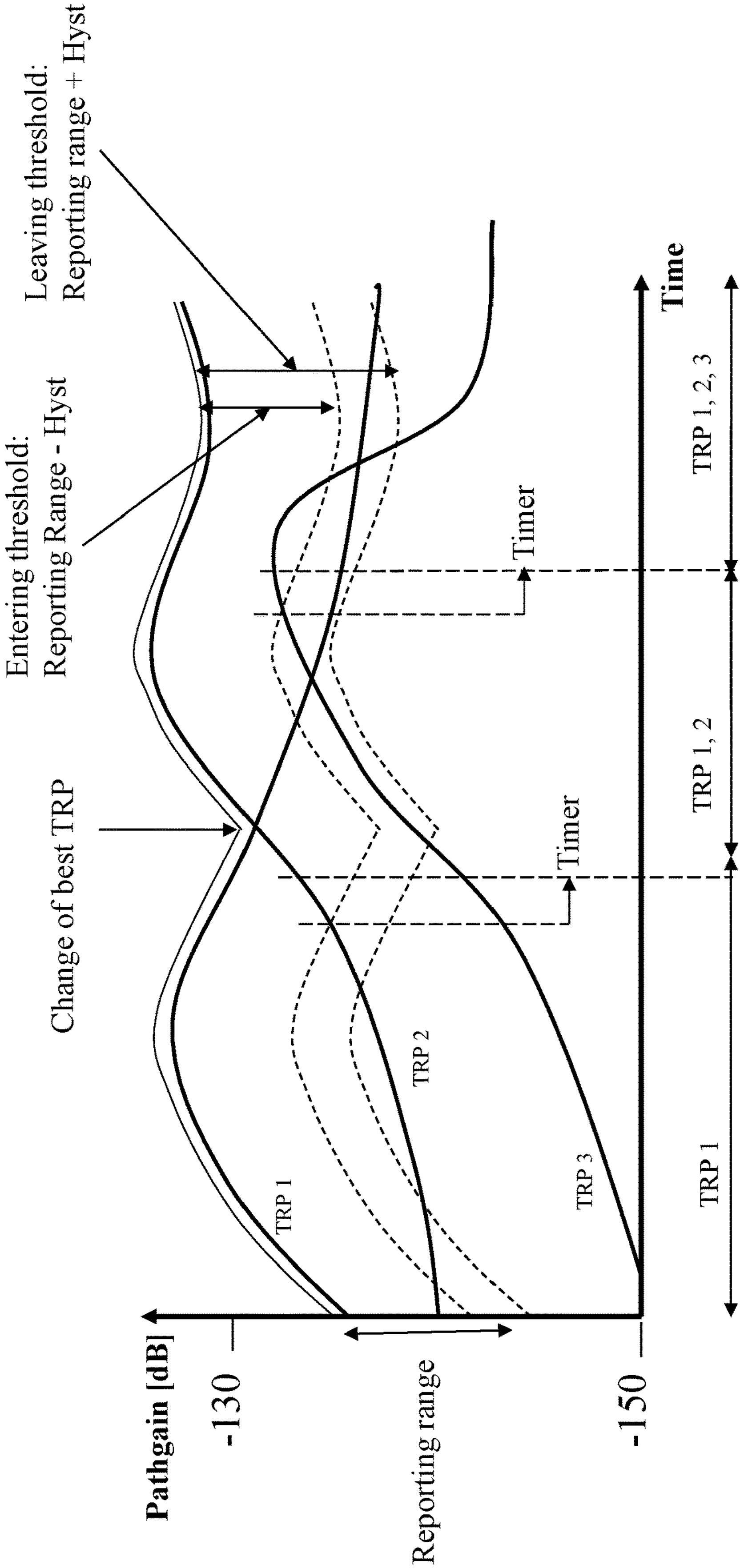
FIG. 8 is a schematic illustration of active TRP measurement sets as a function of performance metrics for different TRPs according to embodiments.

Reference will next be made to FIG. 8 for illustrating a second example of how active TRP measurement sets as maintained for a user equipment 300 can change over time. In FIG. 8 the performance in terms of path gain in dB is plotted against time. Along the time axis is further denoted which TRP, or TRPs, are members of the active TRP measurement set. Although the performance metric being the path gain indicates that the example relates to an active TRP measurement set for evaluating UL performance, the same results can be found also when evaluating DL performance, but with a different performance metric. In the illustrated example it is for illustrative purposes assumed that there are three TRPs and that any of these TRPs either in isolation or in combination with one or two other TRPs is a member of the active TRP measurement set. At the outset, the performance metric is highest for TRP 1 and lowest for TRP 3. Further, neither TRP 2 nor TRP 3 has a performance metric that qualifies these two TRPs to be part of the active TRP measurement set. Hence, at the outset, the active TRP measurement set consists of TRP 1. A reporting range is also shown. The reporting range has a fixed offset with respect to the currently best performance metric. Any TRP having a performance metric within the reporting metric is to be reported by the user equipment 300 to the network node 200. Further, the performance metric needs to be better than an entering threshold value (defined as reporting range−hysteresis) during the duration of a timer to be reported. Further, for a TRP to leave the active TRP measurement set the performance metric needs to be lower than a leaving threshold value (defined as reporting range+hysteresis) during the duration of a timer. As can be seen in the figure, the performance metric for TRP 1 reaches a peak and the declines whereas the performance metric for TRP 2 increases and eventually is better than the entering threshold value longer than the timer duration. This causes TRP 2 to also be included in the active TRP measurement set. Further, the performance metric for TRP 2 even becomes better than the performance metric for TRP 1. Eventually, also the performance metric for TRP 3 is better than the entering threshold value longer than the timer duration. This causes TRP 3 to also be included in the active TRP measurement set. Eventually, the performance metric for TRP 1 becomes so low that it will be lower than the leaving threshold value longer than timer duration. This will cause TRP 1 to be excluded from the active TRP measurement set.

Figure 9:
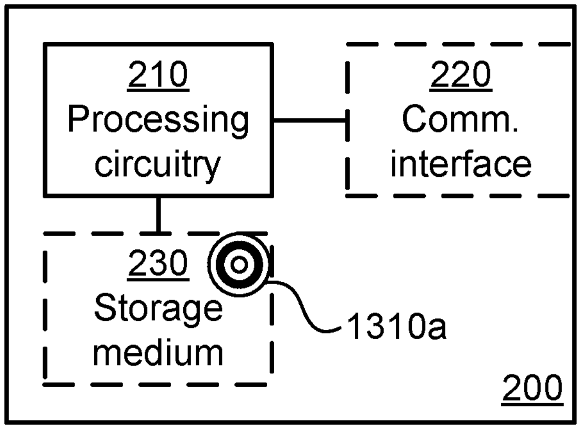
FIG. 9 is a schematic diagram showing functional units of a network node according to an embodiment.

FIG. 9 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310*a* (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, functions, nodes, and devices. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 10:
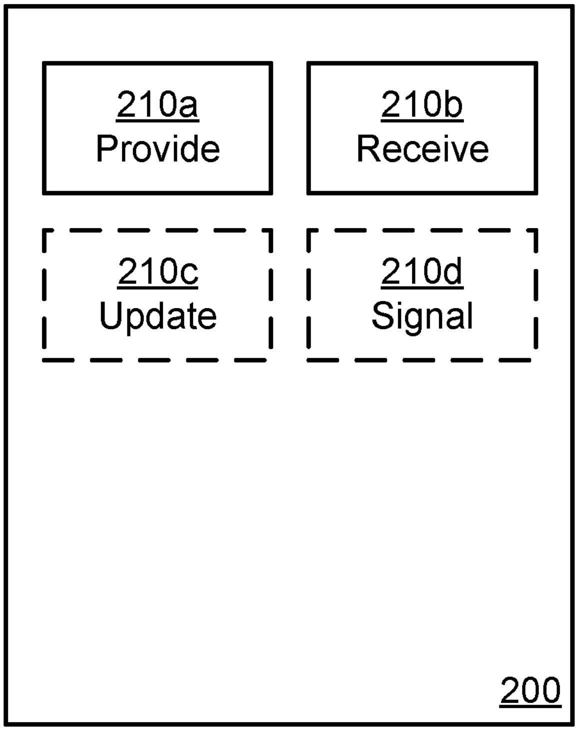
FIG. 10 is a schematic diagram showing functional modules of a network node according to an embodiment.

FIG. 10 schematically illustrates, in terms of a number of functional modules, the components of a network node 200 according to an embodiment. The network node 200 of FIG. 10 comprises a number of functional modules; a provide module 210*a* configured to perform step S102, and a receive module 210*b* configured to perform step S104. The network node 200 of FIG. 10 may further comprise a number of optional functional modules, such as any of an update module 210*c* configured to perform step S106, and a signal module 210*d* configured to perform step S108. In general terms, each functional module 210*a*:210*d* may be implemented in hardware or in software. Preferably, one or more or all functional modules 210*a*:210*d* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*:210*d* and to execute these instructions, thereby performing any steps of the network node 200 as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. Thus, a first portion of the instructions performed by the network node 200 may be executed in a first device, and a second portion of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 9 the processing circuitry 210 may be distributed among a plurality of devices, or nodes. The same applies to the functional modules 210*a*:210*d* of FIG. 10 and the computer program 1320*a* of FIG. 13.

Figure 11:
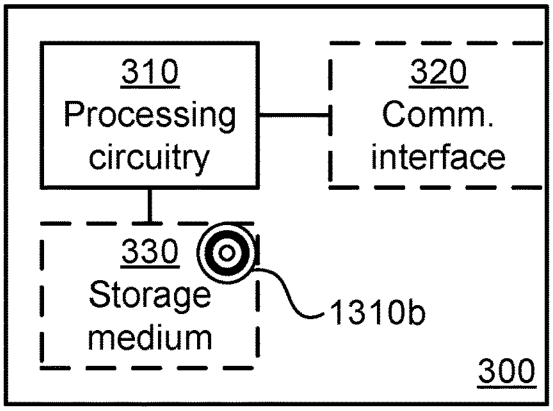
FIG. 11 is a schematic diagram showing functional units of a user equipment according to an embodiment.

FIG. 11 schematically illustrates, in terms of a number of functional units, the components of a user equipment 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310*b* (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the user equipment 300 to perform a set of operations, or steps, as disclosed above. For example, the storage medium 330 may store the set of operations, and the processing circuitry 310 may be configured to retrieve the set of operations from the storage medium 330 to cause the user equipment 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The user equipment 300 may further comprise a communications interface 320 for communications with other entities, functions, nodes, and devices. As such the communications interface 320 may comprise one or more transmitters and receivers, comprising analogue and digital components.

The processing circuitry 310 controls the general operation of the user equipment 300 e.g. by sending data and control signals to the communications interface 320 and the storage medium 330, by receiving data and reports from the communications interface 320, and by retrieving data and instructions from the storage medium 330. Other components, as well as the related functionality, of the user equipment 300 are omitted in order not to obscure the concepts presented herein.

Figure 12:
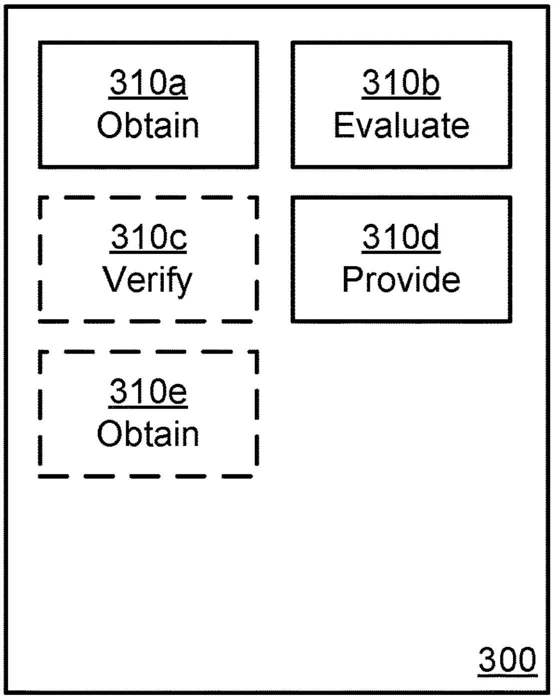
FIG. 12 is a schematic diagram showing functional modules of a user equipment according to an embodiment.

FIG. 12 schematically illustrates, in terms of a number of functional modules, the components of a user equipment 300 according to an embodiment. The user equipment 300 of FIG. 12 comprises a number of functional modules; an obtain module 310*a* configured to perform step S202, an evaluate module 310*b* configured to perform step S204, and a provide module 310*d* configured to perform step S108. The user equipment 300 of FIG. 12 may further comprise a number of optional functional modules, such as any of a verify module 310*c* configured to perform step S206, an obtain module 310*e* configured to perform step S210. In general terms, each functional module 310*a*:310*e* may be implemented in hardware or in software. Preferably, one or more or all functional modules 310*a*:310*e* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*:310*e* and to execute these instructions, thereby performing any steps of the user equipment 300 as disclosed herein.

Figure 13:
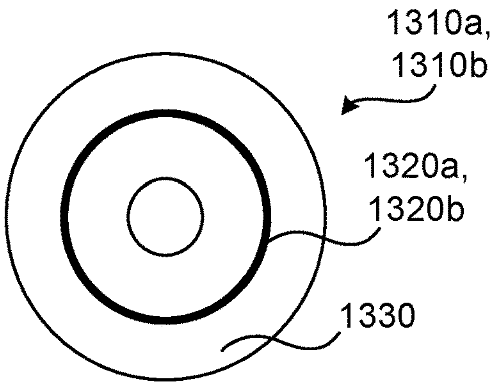
FIG. 13 shows one example of a computer program product comprising computer readable means according to an embodiment.

FIG. 13 shows one example of a computer program product 1310*a*, 1310*b* comprising computer readable means 1330. On this computer readable means 1330, a computer program 1320*a* can be stored, which computer program 1320*a* can cause the processing circuitry 210 and thereto operatively coupled entities and devices, such as the communications interface 220 and the storage medium 230, to execute methods according to embodiments described herein. The computer program 1320*a* and/or computer program product 1310*a* may thus provide means for performing any steps of the network node 200 as herein disclosed. On this computer readable means 1330, a computer program 1320*b* can be stored, which computer program 1320*b* can cause the processing circuitry 310 and thereto operatively coupled entities and devices, such as the communications interface 320 and the storage medium 330, to execute methods according to embodiments described herein. The computer program 1320*b* and/or computer program product 1310*b* may thus provide means for performing any steps of the user equipment 300 as herein disclosed.

In the example of FIG. 13, the computer program product 1310*a*, 1310*b* is illustrated as an optical disc, such as a CD (compact disc) or a DVD (digital versatile disc) or a Blu-Ray disc. The computer program product 1310*a*, 1310*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320*a*, 1320*b* is here schematically shown as a track on the depicted optical disk, the computer program 1320*a*, 1320*b* can be stored in any way which is suitable for the computer program product 1310*a*, 1310*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring a user equipment with measurement configuration of active measurement sets of transmission and reception points, TRPs, the method being performed by a network node, the method comprising:

- providing the measurement configuration to the user equipment relating to at least a first active TRP measurement set and a second active TRP measurement set for the user equipment to at the same time support at least two active TRP measurement sets;
- receiving measurement reporting from the user equipment for at least one TRP included in the first active TRP measurement set and for at least one TRP included in the second active TRP measurement set;
- according to the measurement configuration the user equipment is further configured by the network node to evaluate performance of the first active TRP measurement set and of the second active TRP measurement set according to at least one of:
  - mutually different measurement quantities; and
  - identical measurement quantities but with an offset between uplink performance and downlink performance; and
- the first active TRP measurement set being for evaluating downlink performance and the second active TRP measurement set being for evaluating uplink performance.

2. The method according to claim 1, wherein, according to the measurement configuration, the user equipment further is configured by the network node to evaluate the uplink performance according to a path metric, the path metric being path gain or pathloss, or according to a power metric, the power metric being reference signal received power.

3. The method according to claim 1, wherein the user equipment further is configured by the network node to only provide the measurement reporting when one or both the first active TRP measurement set fulfils a first measurement report triggering condition and the second active TRP measurement set fulfils a second configured measurement report triggering condition, wherein the first measurement report triggering condition and the second measurement report triggering condition are selected from a set of events, and wherein, according to the measurement configuration, the event of the first measurement report triggering condition is different from the event of the second measurement report triggering condition.

4. The method according to claim 1, wherein, according to the measurement configuration, the user equipment is allowed to maintain at least two different TRP sets for evaluating downlink performance, wherein the downlink performance for said at least two different TRP sets is to be evaluated according to any of: mutually different measurement quantities, mutually different frequency bands, mutually different downlink triggering conditions.

5. The method according to claim 1, wherein the method further comprises:

- updating which at least one TRP to be included in the first active TRP measurement set and which at least one TRP to be included in the second active TRP measurement set; and
- signalling updating information to the user equipment identifying which at least one TRP to be included in the first active TRP measurement set and which at least one TRP to be included in the second active TRP measurement set.

6. A method for being configured by a network node with measurement configuration of active sets of transmission and reception points, TRPs, the method being performed by a user equipment, the method comprising:

- obtaining the measurement configuration from the network node relating to at least a first active TRP measurement set and a second active TRP measurement set for the user equipment to at the same time support at least two active TRP measurement sets;
- evaluating performance for the first active TRP measurement set and performance for the second active TRP measurement set;
- providing measurement reporting towards the network node of the performance for at least one TRP included in the first active TRP measurement set and the performance for at least one TRP included in the second active TRP measurement set;
- according to the measurement configuration, the user equipment further is configured by the network node to evaluate the performance of the first active TRP measurement set and of the second active TRP measurement set according to at least one of:
  - mutually different measurement quantities; and
  - identical measurement quantities but with an offset between uplink performance and downlink performance; and the first active TRP measurement set being for evaluating downlink performance and the second active TRP measurement set being for evaluating uplink performance.

7. The method according to claim 6, wherein herein, according to the measurement configuration, the user equipment further is configured by the network node to evaluate the uplink performance according to a path metric, the path metric being path gain or pathloss, or according to a power metric, the power metric being a reference signal received power.

8. The method according to claim 6, wherein the method further comprises:

verifying that one or both the first active TRP measurement set fulfils a first measurement report triggering condition and the second active TRP measurement set fulfils a second measurement report triggering condition before providing the measurement reporting, wherein the first measurement report triggering condition and the second measurement report triggering condition are selected from a set of events, and wherein, according to the measurement configuration, the event of the first measurement report triggering condition is different from the event of the second measurement report triggering condition.

9. The method according to claim 6, wherein, according to the measurement configuration, the user equipment is allowed to maintain at least two different TRP sets for evaluating downlink performance, wherein the downlink performance for said at least two different TRP sets is to be evaluated according to any of: mutually different measurement quantities, mutually different frequency bands, mutually different downlink triggering conditions.

10. The method according to claim 6, wherein the method further comprises:

obtaining updating information from the network node identifying which at least one TRP to be included in the first active TRP measurement set and which at least one TRP to be included in the second active TRP measurement set.

11. A network node for configuring a user equipment with measurement configuration of active sets of transmission and reception points, TRPs, the network node comprising processing circuitry, the processing circuitry being configured to cause the network node to:

provide the measurement configuration to the user equipment relating to at least a first active TRP measurement set and a second active TRP measurement set for the user equipment to at the same time support at least two active TRP measurement sets;

receive measurement reporting from the user equipment for at least one TRP included in the first active TRP measurement set and for at least one TRP included in the second active TRP measurement set;

according to the measurement configuration, the user equipment is further configured by the network node to evaluate performance of the first active TRP measurement set and of the second active TRP measurement set according to at least one of:

mutually different measurement quantities; and identical measurement quantities but with an offset between uplink performance and downlink performance; and the first active TRP measurement set being for evaluating downlink performance and the second active TRP measurement set being for evaluating uplink performance.

12. The network node according to claim 11, wherein, according to the measurement configuration, the network node further configures the user equipment to evaluate the uplink performance according to a path metric, the path metric being path gain or pathloss, or according to a power metric, the power metric being reference signal received power.

13. A user equipment for being configured by a network node with measurement configuration for the user equipment to at the same time support at least two active sets of transmission and reception points, TRPs, the user equipment comprising processing circuitry, the processing circuitry being configured to cause the user equipment to:

obtain the measurement configuration from the network node relating to at least a first active TRP measurement set and a second active TRP measurement set for the user equipment to at the same time support at least two active TRP measurement sets;

evaluate performance for the first active TRP measurement set and performance for the second active TRP measurement set;

provide measurement reporting towards the network node of the performance for at least one TRP included in the first active TRP measurement set and the performance for at least one TRP included in the second active TRP measurement set;

according to the measurement configuration, the user equipment further is configured by the network node to evaluate performance of the first active TRP measurement set and of the second active TRP measurement set according to at least one of:

mutually different measurement quantities; and identical measurement quantities but with an offset between uplink performance and downlink performance; and the first active TRP measurement set being for evaluating downlink performance and the second active TRP measurement set being for evaluating uplink performance.

14. The user equipment according to claim 13, wherein, according to the measurement configuration, the user equipment is configured by the network node to evaluate the uplink performance according to a path metric, the path metric being path gain or pathloss, or according to a power metric, the power metric being a reference signal received power.

* * * * *